US012665904B2

(12) United States Patent
Chamaraj et al.

(10) Patent No.: US 12,665,904 B2
(45) Date of Patent: Jun. 23, 2026

(54) SECURE ASSET MANAGEMENT INFRASTRUCTURE FOR ENFORCING ACCESS CONTROL POLICIES

(71) Applicant: CRYPTOGRAPHY RESEARCH, INC., San Jose, CA (US)

(72) Inventors: Sangeetha Chamaraj, San Jose, CA (US); Matthew E. Orzen, San Francisco, CA (US); Denis Alexandrovich Pochuev, Lafayette, CA (US)

(73) Assignee: Cryptography Research, Inc., San Jose, CA (US)

( * ) Notice: Subject to any disclaimer, the term of this patent is extended or adjusted under 35 U.S.C. 154(b) by 47 days.

(21) Appl. No.: 18/702,638

(22) PCT Filed: Oct. 18, 2022

(86) PCT No.: PCT/US2022/047056
§ 371 (c)(1),
(2) Date: Apr. 18, 2024

(87) PCT Pub. No.: WO2023/069464
PCT Pub. Date: Apr. 27, 2023

(65) Prior Publication Data
US 2025/0023872 A1     Jan. 16, 2025

Related U.S. Application Data

(60) Provisional application No. 63/270,003, filed on Oct. 20, 2021.

(51) Int. Cl.
*H04L 29/00*      (2006.01)
*H04L 9/40*      (2022.01)

(52) U.S. Cl.
CPC .......... *H04L 63/101* (2013.01); *H04L 63/102* (2013.01); *H04L 63/1433* (2013.01)

(58) Field of Classification Search
CPC . H04L 63/101; H04L 63/102; H04L 63/1433; H04L 63/0428; H04L 63/08;
(Continued)

(56) References Cited

U.S. PATENT DOCUMENTS 6,678,828 B1     1/2004  Pham et al.
9,344,455 B2 *   5/2016  Himawan ........... H04L 12/4633
(Continued)

FOREIGN PATENT DOCUMENTS

WO     WO-2010-047080 A1     4/2010

OTHER PUBLICATIONS

Notification of Transmittal of the International Search Report and the Written Opinion of the International Searching Authority, or the Declaration with Mail Date Feb. 28, 2023 re: Int'l Appln. No. PCT/US2022/047056. 32 pages.

*Primary Examiner* — Don G Zhao
(74) *Attorney, Agent, or Firm* — Lowenstein Sandler LLP

(57) ABSTRACT

An application executing at a first platform receives, from a tester device, a first request to generate a secure data asset. Responsive to authenticating the client, the application sends, to a second platform, a second request to determine whether the client has access to the secure data asset. Responsive to receiving an indication, from the second platform, that the client has access to the secure data asset, the application performs one or more operations to generate the secure data asset. The application sends, to the tester device, the generated secure data asset.

20 Claims, 11 Drawing Sheets

(58) Field of Classification Search
CPC ..... H04L 63/0823; H04L 63/10; H04L 63/20; G06F 21/45; G06F 21/602
See application file for complete search history.

(56)                    References Cited

U.S. PATENT DOCUMENTS

| | | | |
|---|---|---|---|
| 9,438,577 B2 * | 9/2016 | Hannel | H04L 63/08 |
| 9,853,979 B1 | 12/2017 | Roth et al. | |
| 10,122,529 B2 * | 11/2018 | Chandrasekaran | |
| | | | H04L 63/0823 |
| 10,250,723 B2 | 4/2019 | Khanduja et al. | |
| 2009/0092252 A1 * | 4/2009 | Noll | H04L 9/083 |
| | | | 380/277 |
| 2015/0186657 A1 * | 7/2015 | Nakhjiri | H04L 9/0836 |
| | | | 713/193 |
| 2015/0278506 A1 * | 10/2015 | Jun | G06F 21/44 |
| | | | 726/6 |
| 2015/0310188 A1 * | 10/2015 | Ford | H04L 63/101 |
| | | | 726/28 |
| 2015/0326540 A1 * | 11/2015 | Hamburg | H04W 12/06 |
| | | | 713/168 |
| 2015/0326541 A1 | 11/2015 | Hamburg et al. | |
| 2015/0326567 A1 * | 11/2015 | Hamburg | G06F 21/72 |
| | | | 713/155 |
| 2016/0036854 A1 * | 2/2016 | Himawan | H04L 63/04 |
| | | | 726/5 |
| 2016/0063272 A1 * | 3/2016 | Sharma | G06F 21/60 |
| | | | 726/1 |
| 2016/0366183 A1 * | 12/2016 | Smith | H04L 63/06 |
| 2017/0041296 A1 * | 2/2017 | Ford | G06F 21/64 |
| 2017/0041349 A1 * | 2/2017 | Ylonen | H04L 9/3268 |
| 2017/0078922 A1 * | 3/2017 | Raleigh | H04L 69/18 |
| 2018/0218145 A1 * | 8/2018 | Hussain | H04L 63/10 |
| 2018/0367316 A1 * | 12/2018 | Cheng | G06F 21/72 |
| 2019/0268165 A1 * | 8/2019 | Monica | H04L 9/3247 |
| 2019/0319945 A1 * | 10/2019 | Levy | H04L 63/205 |
| 2019/0372779 A1 * | 12/2019 | Monica | H04L 9/0637 |
| 2020/0220719 A1 | 7/2020 | Chaudhari et al. | |
| 2020/0266997 A1 * | 8/2020 | Monica | H04L 9/14 |
| 2020/0329041 A1 * | 10/2020 | Mandadi | H04L 63/06 |
| 2021/0056053 A1 * | 2/2021 | Marson | G06F 21/72 |
| 2021/0117249 A1 * | 4/2021 | Doshi | H04L 67/51 |
| 2021/0152545 A1 * | 5/2021 | Park | H04L 9/3268 |
| 2022/0217000 A1 * | 7/2022 | Seaborn | H04L 9/0894 |

* cited by examiner

200

220

102

208

210

222

300

| ACCESS CONTROL POLICY METADATA TABLE 510 | |
| --- | --- |
| Client A Identifier | |
| Use Case | Access State |
| 1 | Allow |
| 2 | Deny |
| 3 | Deny |
| 4 | Allow |
| ... | ... |
| n | m |
| ... | ... |

| ACCESS CONTROL POLICY METADATA TABLE 520 | |
| --- | --- |
| Client B Identifier | |
| Use Case | Access State |
| 1 | Allow |
| 2 | Allow |
| 3 | Allow |
| 4 | Deny |
| ... | ... |
| n | m |
| ... | ... |

FIG. 5

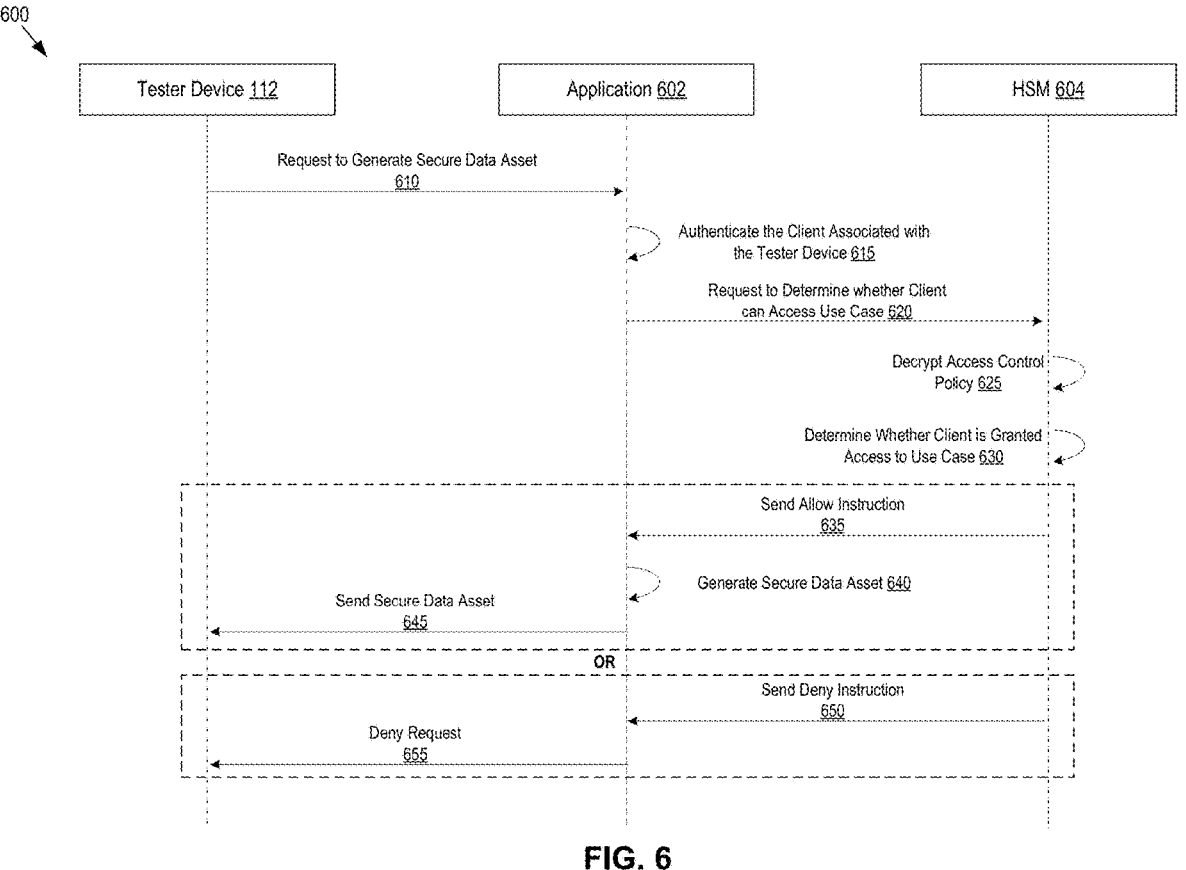

600

Tester Device 112     Application 602     HSM 604

Request to Generate Secure Data Asset
610

Authenticate the Client Associated with
the Tester Device 615

Request to Determine whether Client
can Access Use Case 620

Decrypt Access Control
Policy 625

Determine Whether Client is Granted
Access to Use Case 630

Send Allow Instruction
635

Generate Secure Data Asset 640

Send Secure Data Asset
645

OR

Send Deny Instruction
650

Deny Request
655

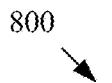

802

Receive, from a tester device, a first request to generate a secure data asset

804

Responsive to authenticating the client, send, to a second platform, a second request to determine whether the client is granted access the secure data asset

806

Responsive to receiving an indication, from the second platform, that the client is granted access the secure data asset, perform one or more operations to generate the secure data asset

808

Sending, to the tester device, the generated secure data asset

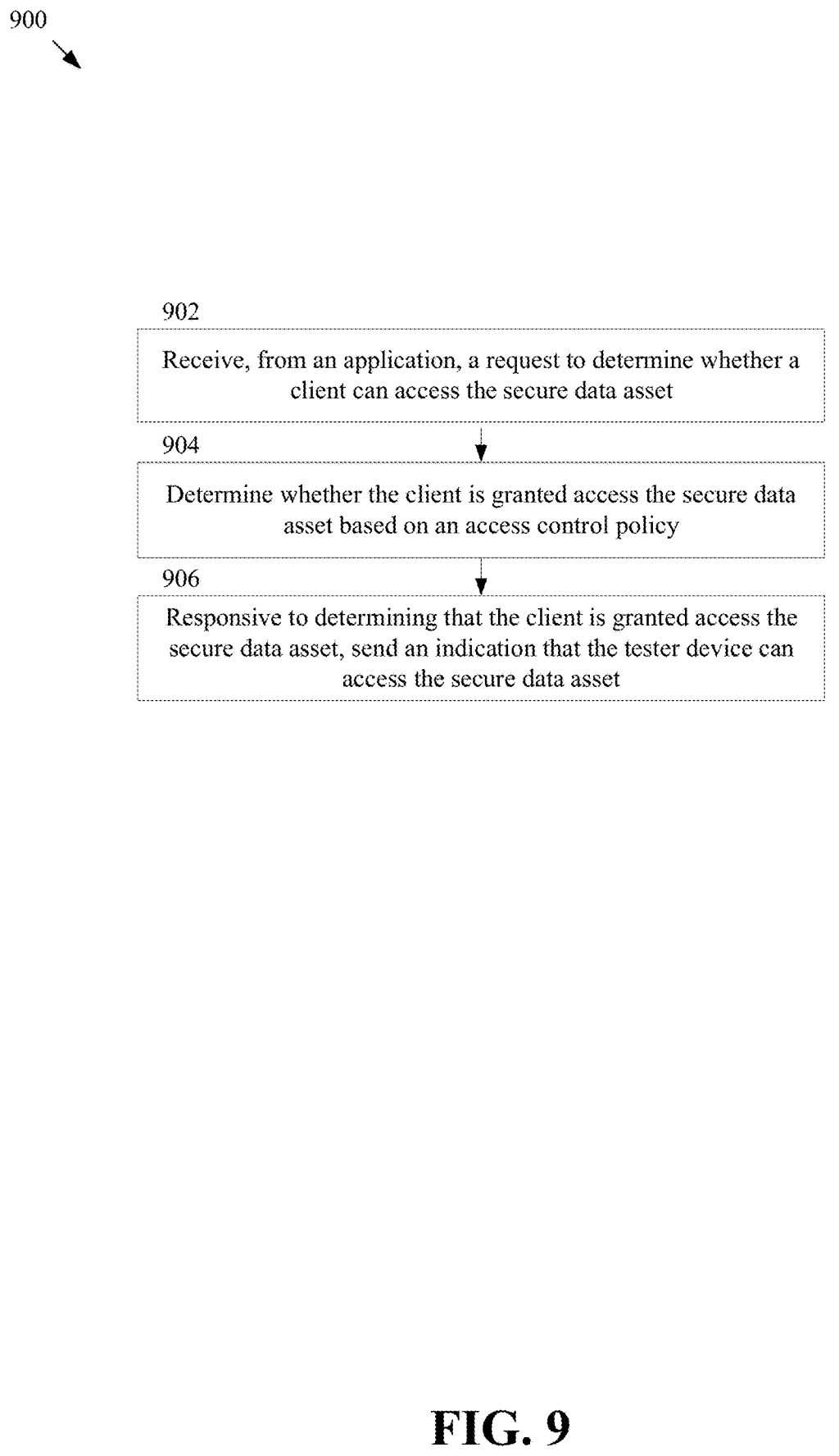

Receive, from an application, a request to determine whether a client can access the secure data asset

904

Determine whether the client is granted access the secure data asset based on an access control policy

906

Responsive to determining that the client is granted access the secure data asset, send an indication that the tester device can access the secure data asset

FIG. 9

SECURE ASSET MANAGEMENT INFRASTRUCTURE FOR ENFORCING ACCESS CONTROL POLICIES

RELATED APPLICATION

This application is a 371 application of International Application No. PCT/US2022/047056, filed Oct. 18, 2022, which claims the benefit of U.S. Provisional Patent Application No. 63/270,003, filed Oct. 20, 2021, which is incorporated herein by reference.

TECHNICAL FIELD

Aspects and embodiments of the disclosure relate to cryptographic management (CM) systems, and more specifically, to systems and methods for using multiple platforms to securely provision a secure data asset to a target device.

BACKGROUND

The need for secure systems and applications is growing. Presently, allegedly secure integrated circuits (ICs) are often programmed with security keys (e.g., cryptographic keys) on the factory floor. Secure keys may be used in a variety of ways, such as, for example, to protect stored data, control access to digital content, or encrypt/authenticate data used in transactions. These keys can be stored in a one-time programmable memory, which may hold keys directly or hold a base key that is used with cryptographic functions that derive keys for other various functions. Typically, security is provided by performing the cryptographic key loading process in a secured facility.

BRIEF DESCRIPTION OF THE DRAWINGS

The present disclosure is illustrated by way of example, and not by way of limitation, in the figures of the accompanying drawings.

FIG. 5 schematically illustrates example metadata maintained by the root device, in accordance with some embodiments of the present disclosure.

FIG. 6 is a sequence diagram illustrating enforcement of the access control policy, in accordance with some embodiments of the disclosure.

FIG. 8 depicts a flow diagram of an example method of using an application running on a high-level OS in the provisioning of a secure data asset to a target device, in accordance with some embodiments of the disclosure.

FIG. 9 depicts a flow diagram of an example method of using a HSM to enforce the access control policy, in accordance with some embodiments of the disclosure.

DETAILED DESCRIPTION

Figure 1:
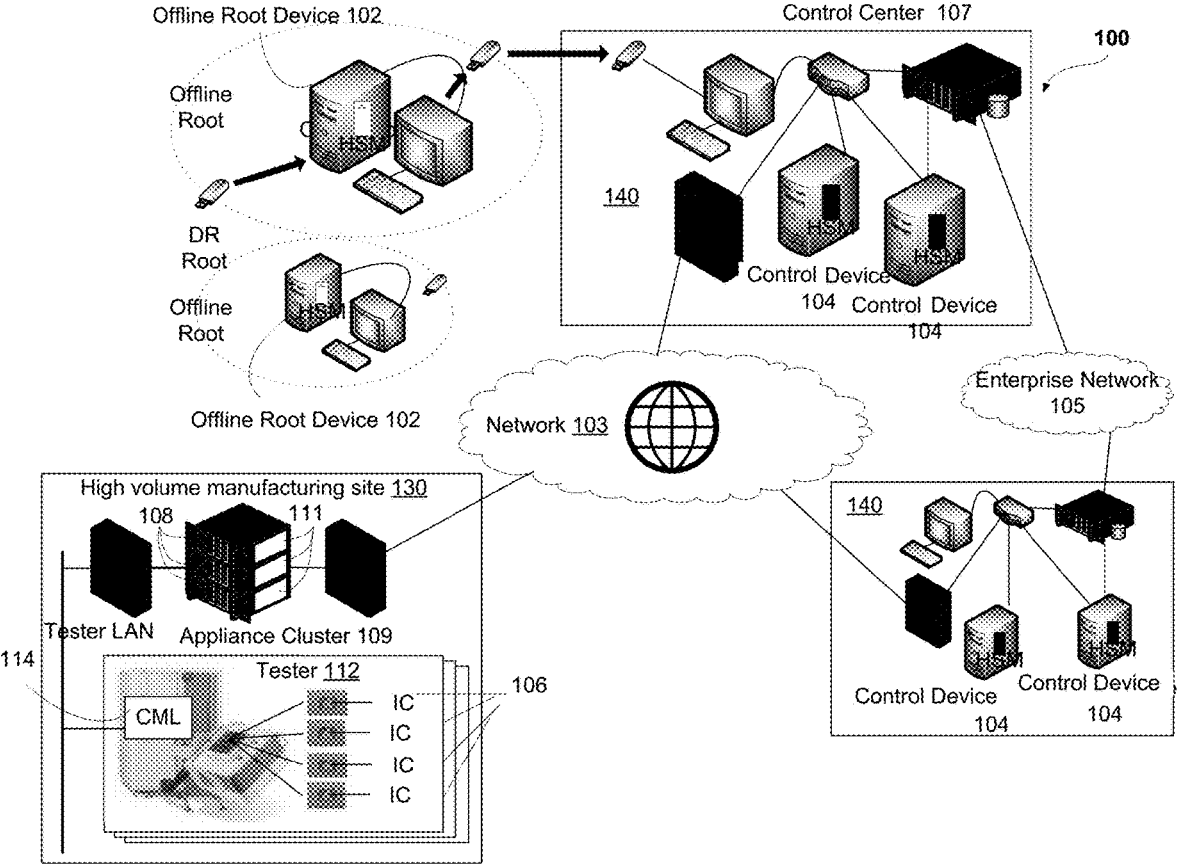
FIG. 1 illustrates a network diagram of a CM system, in accordance with some embodiments of the disclosure.

The embodiments described herein describe technologies of a secure asset management infrastructure enforcing access control policies. The secure asset management infrastructure (also referred to as cryptographic manager (CM) Ecosystem) includes a multi-device cryptographic manager system (hereinafter referred to as "CM system") of hardware and software designed to provide secure chip manufacturing. The CM system includes various authorizing, customizing, and testing subsystems and other processes aimed at secure device manufacturing. The CM system can securely generate, process, and deliver sensitive data, such as secure data assets (e.g., encrypted data, cryptographic keys, authenticated data, a signed certificate, etc.). A CM system can typically include a CM root device (referred to herein as "root device" or "CM root device"), one or more CM control devices (referred to herein as "control device" or "CM control device"), and one or more manufacturing sites that include one or more CM appliance devices (also referred to as "appliance devices" or "appliance cluster"). The CM root device can protect master keys and authorize the setup, installation, configuration and operation of components of the CM system for any given manufacturing site. The CM control device can provide a way to centrally control and monitor operation of the CM system, as well as provision the secure data assets to an appliance cluster.

The appliance cluster can include one or more tester devices. A tester device is a machine used in semiconductor device fabrication to test whether the devices perform properly. The CM system can use tester devices to program and test data, such as secure data assets, during semiconductor device sorting (testing performed on the semiconductor device or part of the semiconductor device that carries the internal circuitry). Typically, a tester device is an untrusted device, located at the manufacturer's site, and used to deliver data assets to the specific target devices that include the semiconductor devices (e.g., a mobile device, a computer device, etc.). To generate the secure data asset, the tester device can request for an application of the appliance cluster to use or invoke a use case. A use case can refer to the processing and generating of a secure data asset. Different use cases can generate or provide different secure data assets. As such, tester devices can be limited in which use cases they can invoke based on, for example, the access privileges of a particular client operating the tester devices.

In some systems, a malicious operator can bypass certain security protocols of an application of an appliance cluster to cause the tester device to use an unauthorized use case. For example, the malicious party can access an application of the appliance cluster and modify a configuration file to add unauthorized use cases to the list of use cases that are allowed to be used by the tester device. Accordingly, it is desirable to prevent malicious operators from gaining access to the use cases allowed to be used by the tester devices.

Aspects of the disclosure address at least the above challenges among others by implementing and enforcing secure access control policies. In particular, a root device can first generate client credentials (e.g., identification data relating to customer, such as a fabless semiconductor vendor). In some embodiments, a user terminal of the root device can initiate a request for the root device to generate client credentials for a particular client. A user terminal refers to a terminal of one of multiple users that are authorized to access the root device. The request can include, for example, a name and identifier (ID) of the client. Responsive to the approval by a quorum of user terminals of the root device (e.g., a set of acknowledgments received from the quorum of user terminals), the root device can generate the client credentials. The client credentials can include client identification data (e.g., a unique client identifier) and data assets, such as a private key, a public key, a certificate, a cryptography algorithm, etc. For example, the client credentials can be a cryptographically signed certificate that includes the unique client identifier. The client credentials can be sent to and used by one or more tester devices (of a cluster of appliance devices) for requesting execution of certain use cases (e.g., processing and generating a particular secure data asset) authorized for the client. In some embodiments, a manufacturing site can produce products (e.g., chipsets) for multiple clients. Accordingly, client credentials can be generated for each of the clients.

The root device can then create and distribute an access control policy to the cluster of appliance devices ("appliance cluster"). The access control policy can indicate to which use cases each client of an appliance cluster is granted access. In some embodiments, the user terminal provides, to the root device, a request to generate an access control policy for an appliance cluster. The request can include identification data relating to each client (client identification data) and the desired access state (e.g., allow, deny, etc.) for each use case for said client. For example, for a first client, the request can instruct the root device to set the access state for use case 1 to "allow," but set the access state for use case 2 and use case 3 to "deny." For a second client, the request can instruct the root device to set the access state for use case 1 and use case 3 to "allow," but set the access state for use case 2 to "deny." In some embodiments, the access control policy can be a data structure (e.g., a metadata table) which includes a set of records. Each record can list, for each client, a specific use case (e.g., via a use case identifier) and a corresponding access state. The root device can generate and encrypt the access control policy using, for example, a cryptographic key (e.g., a pre-shared key (PSK)). The root device can then send the access control policy to appliance cluster.

In some embodiments, a tester device can request an appliance device to execute a particular use case. The request from the tester device can include the client credentials of a particular client and an identifier of the requested use case. To enforce the access control policy, the appliance device can first authenticate the client credentials. For example, the appliance device can compare the client credentials received in the request with a stored record of the client credentials for the particular client. If the client credentials of the request matches the client credentials of the record, the appliance device can instruct a hardware security module (HSM) to determine whether the particular client is allowed access to the requested use case. In some embodiments, the instruction to the HSM can include the encrypted access control policy, client identification data, and the identifier of the desired use case. The HSM can decrypt the access control policy using, for example, the PSK, and perform a lookup of the entries in the access control policy to determine whether the requested use case is indicated as allowed or denied. Responsive to determining that the client is allowed access to the particular use case, the HSM can send an instruction, to the appliance, to allow the tester device to execute the use case. For example, the appliance (or the HSM) can perform secure generation of the secure data asset correlating to the use case.

As noted, a technical problem addressed by embodiments of the disclosure is an inability of some CM systems to prevent a malicious operator from bypassing certain security protocols of an appliance device to execute a use case that the appliance device is not authorized to execute.

A technical solution to the above identified technical problems may include implementing secure access control policies to verify to which use cases a specific tester device has access to. Thus, the technical effect may include a CM system that has improved security features that prevent malicious operators from bypassing certain security protocols of an appliance device to cause a tester device to use unauthorized use cases.

A data asset (also referred to a "secure data asset" or "secure asset" herein) can refer to sensitive data that is generated, at least in part, by a module. A data asset can include one or more of encrypted data (e.g., cryptographic keys), authenticated data (e.g., confirmation of the origin and/or integrity of the data), or a certificate (e.g., a data block authenticated using an authenticating digital signature). In some embodiments, the data asset can include a Sequence, as described below. In still some embodiments, the data asset can include specialized software code.

A hardware security module (HSM) can refer to a tamper-resistant physical computing system used to safeguard the processing and storage of sensitive data. The HSM can include hardware (e.g., one or more cryptographic processing devices), software or a combination thereof that operate together to safeguard the sensitive data. The HSM can safeguard and manage digital keys, perform encryption and decryption functions for digital signatures, perform strong authentication or other cryptographic functions. In some embodiments, an HSM can be a plug-in card or an external device that attaches directly to a computer or network server. If the HSM were to be maliciously opened, the keys and potentially some hardware of the HSM would be destroyed and unrecoverable.

A module can refer to data and/or software code, often custom firmware that can run inside an HSM and that can perform security sensitive computations. The execution of the module can result in a module response that can include one or more secure data assets. A single appliance cluster may run many modules and each module may be designed to provide a single type of transaction (e.g., singed certificate) to a target device. A particular module can be used with one or more contexts.

A context (also referred to "context data" herein) can refer to secure data that is often encrypted and may be used to generate a secure data asset. In some embodiments, a context can include one or more cryptographic private keys and/or additional data. In embodiments, a particular context typically can be used with a single module. For example, a module can decrypt an encrypted context and use the private key to sign a digital certificate. In some embodiments, different contexts can be used by the same module. By implementing a context, a module can be re-used for different contexts (e.g., different private keys) without having to re-write the module for the different private keys, for example. In some embodiments, a context can be the same for every execution of a use case (UC). In some embodiments, the context is only data (e.g., no software code).

An application can refer to software that runs on a high-level operating system (OS), such a Linux or other OS.

The application can be integrated in the processing, generation and delivery of secure assets to target devices. In some embodiments, the application can interface between the tester device and HSM in the provisioning of secure assets to target device. The application can perform one or more custom functions and/or procedures, and/or make calls over the network (e.g., unsecured public network) to retrieve data and/or request services. In some embodiments, the application can perform less secure operations of the provisioning process than the HSM. In some embodiments, resource intensive operations (e.g. computational resource intensive operations such as parsing in Abstract Syntax Notation One (ASN.1)) can be offloaded (from the HSM) to the application to take advantage of the additional computer resources provided by the server system implementing the application.

A library component (also referred to as "library" or "library module" herein) can include pre-written code that includes one or more of functions, procedures, or corresponding values. The library component can also execute the pre-written code. In some embodiments, the library component can be stored and/or executed at an HSM. In some embodiments, the library component can be middleware that provides an interface between the application running on an operating system (OS) and the module. In some embodiments, the library component provides functions and/or procedures that can be used with and help assist with the execution of tasks related to modules. In some embodiments, the library component can work with multiple different modules. In some embodiments, the library component is configured to execute standard functions and procedures on behalf of the modules.

Use case (UC) can refer to the multiple elements such as a context, a module, and application that can be used together in the generation, processing, and/or delivery of secured data assets to target devices. In some embodiments, the UC can include a library component or information related to the library component (e.g., version number). In some embodiments, the context, module and application are cryptographically bound (e.g., immutable) such that only the particular context, particular module, and particular application work together in the provisioning of the secured assets to target devices. In some embodiments, the context, module and application are cryptographically bound such that a cryptographic key is created and applied in manner that the particular context, particular module and particular application will only work together after satisfying various cryptographic checks.

FIG. 1 illustrates a network diagram of a CM system 100, in accordance with some embodiments of the disclosure. The CM system 100 can includes a variety of cryptographic manager (CM) devices. In some embodiments, the CM system 100 may provide secure transaction processing and data reporting infrastructure designed to provide secure key and asset management capabilities to a target device 106 (e.g., mobile devices) through a web service interface. The user or customer for the CM system 100 may include fabless semiconductor vendors, for example, that produce chipsets for mobile devices, system integrators (OEMs) that manufacture internet connected devices, or mobile network operators (MNOs) that deploy these devices on their wireless networks, etc. Such customers may contract out some of the fabrication of their devices or components to third-party manufacturers that operating remote manufacturing facilities, such as a high-volume manufacturing site 130. As a mission critical part of the customer's manufacturing and communications systems, design priorities for the CM system 100 are high availability and integrity.

The manufacturing and assembly of electronic devices and other devices containing electronic components, such as microcontrollers, sensors, processors, etc., have increased along with the increased usage of hardware devices. In effort to reduce the costs of manufacturing, many companies have outsourced aspects of the manufacturing process to third-party companies. Some of these third-party companies may be overseas and may be in jurisdictions in which corporate security is not as robust as in other jurisdictions.

In the manufacturing of certain devices, software, codes, keys and other important sensitive assets (e.g., data assets) may be embedded in or installed on the hardware devices. Currently, these data assets may be transported from the customer to a manufacturing site on a storage medium, such as stored on an optical disc. The management of these data assets may be important to the security and revenues of the customer as it not entirely satisfactory in all respects. The embodiments described herein provide secure-asset management systems and technologies to securely provision data assets to these hardware devices in untrusted environments. The secure-asset management system includes many components that cooperate to allow a customer to monitor and control the receipt and consumption of such data assets during the manufacturing process performed by the third-party manufacturer. The system includes remote components installed at the third-party manufacturer and components used by the customer to communicate with and control these remote components. A data asset, such as a key or key set, a certificate, a unique device identifier, etc., can be securely transferred to the target device before the target device is ready for sale to a consumer (e.g. fully operational).

The CM system 100 includes a root device 102 that is an entity which authorizes installation, configuration and operation of the CM System 100. The root device 102 may protect master keys and authorize the setup, installation, configuration and operation of components of the CM system 100 for any given site, such as manufacturing site 130. In some embodiments, the root device 102 may be considered an offline root device that authorizes setup and major configuration parameters in the operation of the CM System. In some embodiments, data is transferred to and from the root device 102 by a removable storage device, such as a Universal Serial Bus (USB) Flash drive or the like. Computer systems are subject to trade-offs between security and convenience. Given that the main task of the Root Authority, at least in some embodiments, is to protect master keys that underpin security of an entire CM deployment, the Root Authority design is driven by the need for security. This is why the Root Authority may be, at least in some embodiments, air-gapped (i.e., not connected to any computer network). Additionally, an HSM may be used to protect most important keys stored by the Root Authority. Because the Root Authority is off-line, it is not assumed to be continuously available. As a result, the Root Authority may authorize a range of permitted actions in advance so that it is not necessary to involve the Root Authority when an action needs to be taken. The Root Authority's authorizations are provided to the Control device, where decisions are made about which authorizations will actually be used.

In some embodiments, operations of the root device 102 can be initiated by one or more user terminals connected to the root device 102. A user terminal can include a command line interface (CLI) of a display device coupled to the CM root 102 (e.g., user terminal 208 discussed in FIG. 2). A user terminal can initiate a session or access a session already initiated. The session can include a request for the root device 102 to create client credentials, create an access control policy, etc. The request(s) can include one or more desired parameters, which will be explained in more detail in FIGS. 3 and 4. In response to the request, the root device 102 can execute the request to create client credentials, create an access control policy, etc. In some embodiments, the request can be initiated after receiving an acknowledgment from a quorum of user terminals. For example, the root device 102 can include three user terminals. The root device 102 can be configured to execute a request in response to receiving the request from one user terminal, and receiving acknowledgments to execute the request from the other two user terminals. In some embodiments, each user terminal can be accessed by one or more particular operator upon verification of a set of credentials (e.g., password, authentication token, radio-frequency identification (RFID), etc.).

A control center 107 (hereinafter "control" or "control center"), including one or more control devices 104, can provide a way to centrally control and monitor operation of the CM system 100, as well as provision data to an appliance cluster 109 (a collection of one or more appliance devices 108), in accordance with some embodiments of the disclosure. In some embodiments, the control device 104 can include a hardware appliance used to facilitate central management of the CM system 100 and to provision data to an appliance cluster 109. Additionally, a control device 104 can distribute (via appliance devices 108) on or more of modules, context data, applications, library component, version data of the library component, other data or security parameters destined for target devices 106. In some embodiments, a target device 106 includes at least one memory device to store data assets. In some embodiments, target device 106 includes a monolithic integrated circuit. In some embodiments, the control devices 104 of the control center 107 may reside in the customer's physically secure corporate data center 140 and may provide a turn-key security service to the customer to manage its data assets in a remote manufacturing site 130. In another embodiment, the control center 107 may include multiple control devices 104 at multiple data centers 140 connected over an enterprise network 105, as illustrated in FIG. 1.

In some embodiments, a data asset can include a digital data file, such as an HDCP Device Key Set, which is to be securely transferred to a target device 106 (e.g. CM core). A data asset can include any sensitive data such as keys, serial numbers, and firmware that are managed securely through the CM system and provisioned to target devices at various lifecycle stages from manufacturing supply chain to the end user. Data assets can be device-specific. For example, perso1, perso2, and device serialization records are data assets. An organization may create and sell HDCP keys. For example, a customer buys their keys from the organization, and then imports HDCP keys into the CM Service. The import process can reformat the key file as a pre-computed (PCD) file and encrypt it so that only suitably authorized appliance devices can access the PCD file. The appliance cluster 109 can be responsible for locally hosting sensitive data assets to be transferred to the target devices 106 during the process of manufacturing the target devices 106 at the manufacturing site 130.

The capability to manage the distribution network of appliance clusters 109 and to provision data assets (e.g., PCD assets), ticket authorizations, applications, contexts modules, library components, and library version identifiers across a network 103 of security appliance devices 108 may be provided by a web service interface to users of the CM system 100. The appliance cluster 109 may be responsible for securely storing sensitive data (e.g., data assets) locally in the manufacturing facility site 130 and for making that data assets highly available in a low latency manner to a target device 106, such as a system-on-a-chip (SoC) or a subcomponent on such an SoC, during the process of semiconductor device test and/or manufacturing. The target device 106 may be integrated into the SoC design during the design phase of the SoC to provide cryptographic control of SoC feature activation, configuration management, and secure key management.

In some embodiments, the target devices 106 each include one or more CM cores. In some embodiments, a specialized CM core can include a specialized integrated circuit, which can be implemented in some embodiments described herein. It should be noted that aspects of the disclosure can be applied to CM cores (e.g., integrated circuits) generally, as well as to specialized CM cores. In some embodiments, the specialized CM core can include a hardware core capable of executing a set of commands (e.g., Sequence), which can be the building blocks for delivering functionality to a product (target device 106). The specialized CM core can be a hardware core that is configured to execute a set of commands to provide cryptographic control of the secure data asset when the target device is deployed in a Product. For example, the set of command can include one or more of a command feature that includes command activation of one or more features of the target device 106 or a command for secure key management of the target device. A sequence can refer to software (e.g., script) and/or data that assists in the provisioning of a data asset to a target device. In some embodiments, the module can securely generate a unique Sequence based on information, such as one or more a context, PCD, arguments or other information. The Sequences can provide secure and authenticated programming instructions to the target device. A Sequence can include a sequence of operations to be performed as a transaction of a specific transaction type with respect to a target device (e.g., specialized CM Core).

An appliance device 108 can include one or more servers designed to provide secure computation, digital signing and distribution of data assets to target devices 106. In some embodiments, appliance devices 108 each contain a hardware security module (HSM) 111, which serves both as a vault safeguarding sensitive data and as a platform for execution of a module. Additionally, appliance device 108 generates, collects, protects, digitally signs and sends a variety of logging information to the customer via the control center 107. In some embodiments, an appliance devices 108 can execute an application the runs on a high level OS. In some embodiments, the application can be executed outside the HSM 111.

A delegate (also referred to as a "delegate appliance" herein) is an entity (such as a specialized appliance) to which root device 102 grants a subset of programming capabilities, allowing incorporation of data unknown to the root device 102 into data assets destined for target devices 106.

The appliance cluster 109 is a group of appliance devices 108 providing increased availability of the services offered by an appliance device 108. If a particular appliance device 108 is unable to fulfill a request, a tester device 112 can connect to any other appliance device 108 in the same appliance cluster 109 to continue service without major interruption.

In some embodiments, tester device 112 is a machine used in semiconductor device fabrication to test whether devices perform properly. The CM system uses tester devices 112 to program data, such as data assets, during wafer sort and package test, in some embodiments. In some embodiments, a tester device 112 is generally an untrusted device, located at the manufacturer's site 130, used to deliver data assets to the specific target devices 106. In some embodiments, the tester device 112 is a device designed to perform validation, characterization, and high-volume manufacturing tests. Tester device 112 can run a series of semiconductor tests, one or several of which will be a part of the CM system operation. The tester device 112 is relied on to initiate the communications with the appliance cluster 109 and to provide logging information.

In some embodiments, the tester device 112 can access a client library 114. The client library 114 may be a software component to be integrated with a primary application of the tester device 112. The client library 114 may be the CM client library. The tester device 112 can use the CM client library to access functions and/or procedures used with the application in provisioning a secure data asset to a target device 106.

To make the data available to the target device 106, the appliance cluster 109 may be connected to the asset management service, called control center 107, over a network 103, such as the public internet, a private network, and/or combinations thereof. The appliance cluster 109 may reside in a data center of the outsourced manufacturing facility site 130 and may act as a proxy to the control center 107. The appliance clusters 109 make available a secure and highly available local inventory of data (e.g., PCD assets) and ticket authorizations during manufacture to target devices 106 using strong authentication and access control in a low latency manner.

In some embodiments, the provisions and/or installation of a data asset to a target device 106 may be referred to as an asset-management transaction. A single appliance cluster 109 may run many modules and each module may be designed to provide a single type of transaction to a target device. The security sensitive computations used or performed by the module may be performed on a HSM 111. Other operations (e.g., less security sensitive operation) related to the asset-management transaction can be performed by the application. In some embodiments, the application executes on the same or different appliance cluster 109, but outside the HSM 111. In some embodiments, the application executes outside the appliance cluster 109. A module, along with the tamper-proof HSM 111 on which the module executes, may consume a target device specific authorization, or ticket, from a bulk authorization file provisioned by the control center 107 to the appliance device 108 or appliance cluster 109.

In some embodiments, a PCD Template is a description of how the PCD, which, in some embodiments, becomes input for a particular type of module, is formatted. In some embodiments, the application can also use the PCD to, or example, generate another PCD or perform one or more cryptographic checks. A PCD type is a set of PCDs based on a particular PCD Template, having a particular property, such as uniqueness, serialization, etc. For example, a PCD can include CM root-generated keys, serial numbers etc. that are securely packaged such that only the CM Core (e.g., specialized CM Core) on a target device 106 can provision the data. In another example, the PCD includes keys from various vendors (for example, HDCP keys) securely managed from the CM control to the target device. Key data are transformed into PCD on loading into the CM control.

It should be noted that various portions of the description refer to components of the CM system 100, such as root, control or appliance as logical entities. Sometimes the internal structure of a logical entity is important. In some embodiments, a Control entity can include one or more servers, a shared file system, a shared database, or the like. In the contexts where internals of Control center 107 are important and each of these servers is viewed as a logical entity, each of them is referred to as Control device, to distinguish it from the Control entity (which represents Control devices as well as shared resources). In some embodiments, a root device 102 can include a server implementing the functionality of the Root Authority. In some embodiments an appliance device can include one or more servers e.g., a member of the appliance cluster 109 of appliance devices 108). In some embodiments, a Target Device 106 (e.g., a CM core (e.g., integrated circuit) of the target device) is the consumer of the functionality of the CM system 100. In some embodiments, the root devices 102, Control devices 104 and appliance devices 108 each include a main computing device (e.g., one or more processing devices or the like) as well as an embedded HSM 111. Some of the identifiers (IDs) and cryptographic keys will be stored inside the HSM 111, while others will be stored on the device's hard drive. Exact location of the IDs or keys can be determined based on their sensitivity and the implementation details as described herein. In some embodiments, IDs are used to identify components within the CM System 100. Some of the components are entities (e.g. Control center 107), while others are devices (e.g. Control device 104).

Figure 2A:
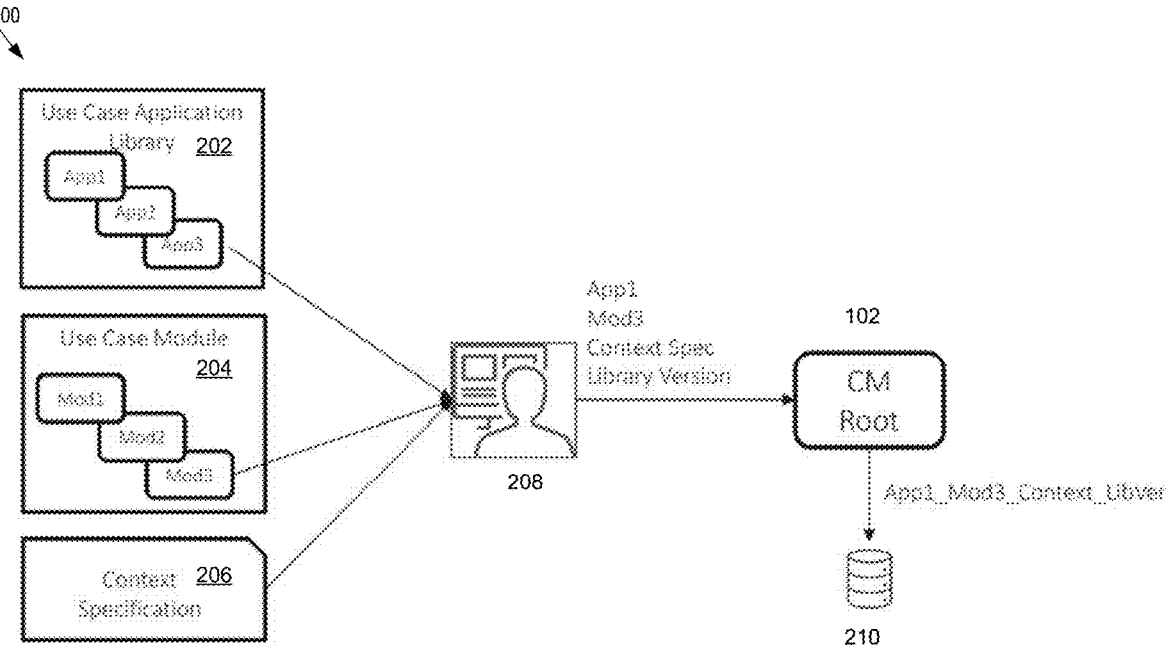
FIG. 2A is a diagram illustrating use case (UC) creation at a CM system, in accordance with some embodiments of the disclosure.

FIG. 2A is a diagram illustrating use case (UC) creation at a CM system, in accordance with some embodiments of the disclosure. Diagram 200 illustrates use case application library 202, use case modules 204, context specification 206, user terminal 208, CM Root 102, and data store 210.

In some embodiments, data store 210 is a persistent storage that is capable of storing data as well as data structures to tag, organize, and index the data. Data store 210 may be hosted by one or more storage devices, such as main memory, magnetic or optical storage based disks, tapes or hard drives, NAS, SAN, and so forth. In some embodiments, data store 210 may be a network-attached file server, while in other embodiments, data store 210 may be some other type of persistent storage such as an object-oriented database, a relational database, and so forth, that may be hosted by CM system 100 or one or more different machines coupled to the CM system via the network 103.

Use case application library 202 may include N number of applications (e.g., App 1 through App 3). Use case modules 204 may include N number of modules (e.g., Mod 1 through Mod 3). In some embodiments, particular applications of the use case application library 202 and particular modules of the use case modules 204 are interoperable, while other applications of the use case application library 202 and modules of the use case modules 204 are not interoperable. For example, module 1 of the use case modules 204 can perform certificate generation (e.g., hashing and singing data, without necessarily knowing what the data is). Module 1 can be interoperable with application 1 and application 2, but not interoperable with application 3. Application 1 can be used with signing an X.509 certificate (e.g., X.509 can refer to an International Telecommunication Union standard defining the format of public key certificates) and application 2 can be used with signing a custom certificate (e.g., compressed certificate with a custom format that is not based on any standard).

Context specification 206 can refer to a layout, definition or template of the context that can be used with particular use cases. The context specification 206 can identify or define the particular context(s) that can be used for a use case. For example, for the use case that includes application 1 and module 1, the context specification 206 can identify three keys (e.g., a first 256 bit key, a second 256 bit key, and a 128 bit key) that can be used with application 1 and module 1.

In an illustrative example, use case 1 may be related to signing an X.509 certificate and may include application 1 and module 1. The context specification 206 can identify a one or more 256-bit keys for use with the X.509 certificate generation use case 1. In another example, use case 2 may be related to signing the custom certificate and may include application 2 and module 1. The context specification 206 can identify a 128-bit key for use with the custom certificate generation use case 2.

As illustrated in diagram 200, user terminal 208 (e.g., command line interface (CLI) of a display device coupled to the CM root 102) can use one or more applications from the use case application library 202, one or more modules from the use case modules 204 and the context specification 206 as input to generate a use case. For example, application 1, module 1 and the context specification can be identified at the CLI and submitted to the CM root to generate use case 1. The CM root can associate the elements of the particular use case and store those elements at data store 210. In some embodiments, the elements of the use case can be cryptographically bound and stored at data store 210.

In some embodiments, the input data can include an identifier of the library version of the library component that is to be used with the use case. For example, the identifier of the library version can identify the current version of the library module associated with one or more of the application (e.g., application 1) or the module (e.g., module 1). In some embodiments, in which the library version is used as input to create a use case, the use case can include a module, an application, a context, and at least an identifier of a version of the library component. In some embodiments, rather than cryptographically bind the library version with the other elements of the use case, the identifier of the library version can be stored as metadata that is associated with the use case.

In some embodiments, the CM root 102 stores the use case at data store 210. In some embodiments, the stored use case can later be distributed, such as to one or more appliances.

It can be noted that in some embodiments, the same application and the same module can be used together with different contexts to form different use cases. For example, application 1 and module 1 can be used in conjunction with context 1 for a use case 1. In this example, application 1 and module 1 can be used for X.509 certificate generation and context 1 specifies a first 256-bit key. Application 1 and module 1 can be re-used in conjunction with context 3 for use case 3. In this example, application 1 and module 1 can still be used for X.509 certificate generation, but context 3 specifies a different 256-bit key. In some embodiments, context allows for the re-use of one or more of the application or module.

Figure 2B:
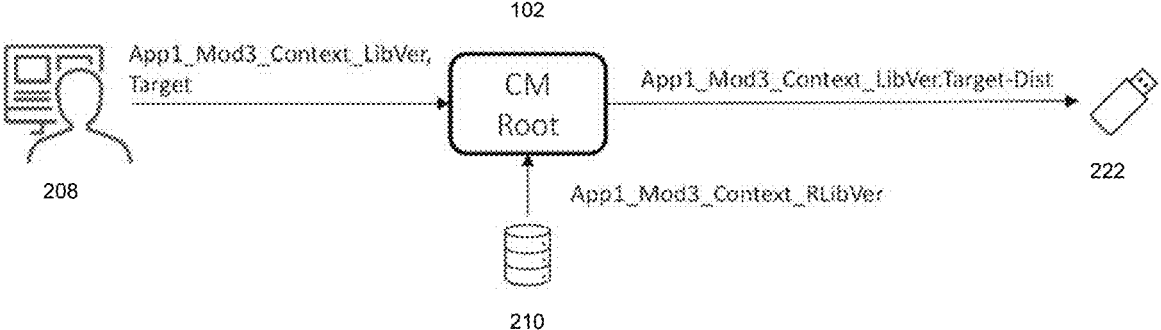
FIG. 2B is a diagram illustrating use case (UC) distribution at a CM system, in accordance with some embodiments of the disclosure.

FIG. 2B is a diagram illustrating use case (UC) distribution at a CM system, in accordance with some embodiments of the disclosure. Diagram 200 illustrates the distribution of the use case, for example, the distribution of a use case to an appliance device 108 of the appliance cluster 109. For example, a user can request the distribution of a use case, via user terminal 208, to device 222, such as an offline storage device (e.g., USB). The distribution request can identify the use case by name/identifier (e.g., use case 1) or one or more of the elements of a particular use case (e.g., module 1, application 1 and context 1). The CM root 102 can retrieve the requested use case from data store 210 and sent the use case to device 222.

In some embodiments, the CM root 102 encrypts the use case using a key (e.g., key1). Responsive to a distribution request, the key (e.g., key 1) is encrypted with another key (e.g., key 2) that was previously shared with the appliance to which the use case is to be distributed. The encrypted use case and the encrypted key (e.g., key 1) can be saved to device 222 and distributed to appliance cluster 109 of FIG. 1. The appliance cluster 109 possesses key 2, which allows the appliance cluster 109 to decrypt the encrypted key (e.g., key 1) that can be used to decrypt the encrypted use case.

In some embodiments, the use case can be cryptographically bound responsive to the distribution request. In other embodiments, the use case can be cryptographically bound responsive to the request to create the use case illustrated with respect to FIG. 2A above.

Figure 3:
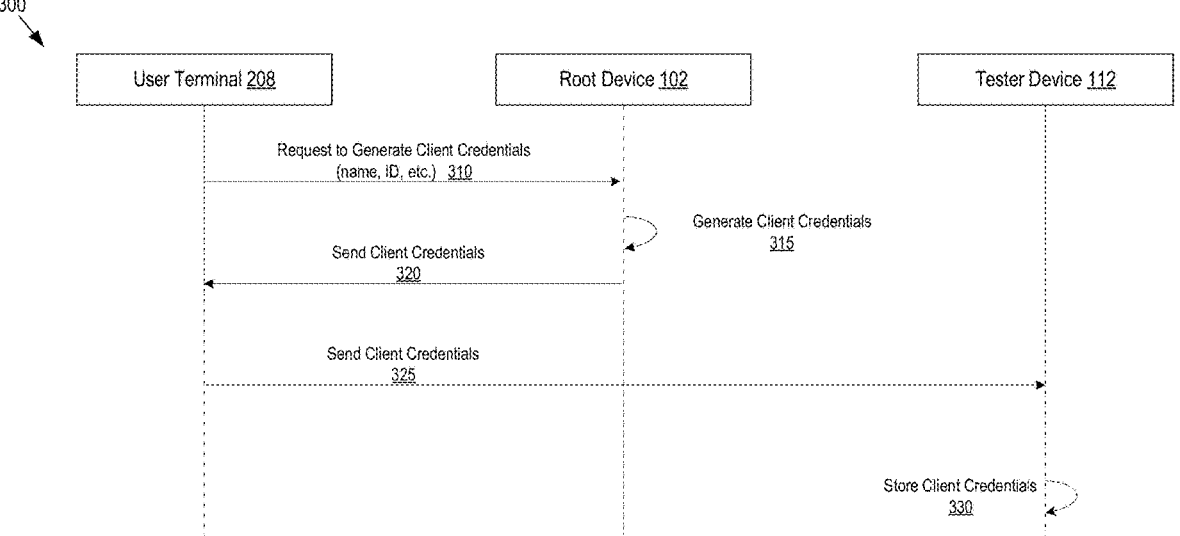
FIG. 3 is a sequence diagram illustrating creation and distribution of client credentials, in accordance with some embodiments of the disclosure.

FIG. 3 is a sequence diagram illustrating creation and distribution of client credentials, in accordance with some embodiments of the disclosure. Diagram 300 may include similar elements as illustrated in CM system 100 as described with respect to FIG. 1. It may be noted that elements of FIG. 1 may be used herein to help describe FIG. 3. The operations described with respect to FIG. 3 are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

Diagram 300 illustrates root device 102, tester device 112, and user terminal 208. In some embodiments, user terminal 202 can be connected to, or a component of, root device 102.

At operation 310, the user terminal 202 sends, to the root device 102, a request to generate client credentials. The request can include identification data relating to a client (e.g., a customer, a fabless semiconductor vendor, etc.). This client identification data can include, for example, a client name, the client identifier (ID), or any other data related to the client. In some embodiments, the user terminal 202 can initiate the request, which can then be confirmed by a quorum of user terminals 208. Once confirmed by the quorum of user terminals 208 (e.g., a set of acknowledgments received from the quorum of user terminals 208), the request can be sent to the root device 102. In other embodiments, the user terminal 208 send the request independent of any acknowledgements from other user terminals 208.

At operation 315, the root device 102 generates the client credentials. The client credentials can include a secure data asset(s), such as a private key, a public key, a certificate, a cryptography algorithm (e.g., Data Encryption Standard (DES), Rivest-Shamir-Adleman (RSA), hash function(s), etc.), etc. In some embodiments, the client credentials can further include the client identification data. In some embodiments, the client credentials can further include a unique client identifier generated by the root device 102. The unique client identifier can be generated (e.g., using a hash function, using a specific algorithm, etc.) using, for example, the client identification data. For example, the client credentials can be a cryptographically signed certificate that includes the unique client identifier. In some embodiments, based on the client identification data, the client credentials can be designated to be supplied or assigned to one or more tester devices 112 of an appliance cluster 109 (e.g., a single tester device 112, a set of tester devices 112, all of the tester devices 112 of the appliance cluster 109, etc.).

The client credentials can be generated for multiple clients of a High volume manufacturing site 130. For example, a manufacturing site 130 can generate chipsets for three different clients. Accordingly, the root device 102 can generate client credentials for each of the three clients.

At operation 320, the root device 102 sends, to the user terminal 208, the client credentials. In some embodiments, the client credentials can be encrypted (e.g., with a private-public key pair, with an encryption algorithm, etc.). In other embodiments, the client credentials can remain unencrypted. In some embodiments, data is transferred to and from the root device 102 by a removable storage device, such as a Universal Serial Bus (USB) Flash drive or the like.

At operation 325, the root device 102 sends the client credentials to one or more tester devices 112. For example, the client credentials can be transferred or sent to the control center 107, and then sent to the tester device(s) 112 (or any other component of the manufacturing site 130). In some embodiments, the client credentials can be sent to a set of tester device 112. For example, if an appliance cluster 109 include three tester devices 112, the client credentials can be sent to each tester device 112. Based on the identification data, each tester device 112 can use the client credentials.

At operation 330, the tester device 112 stores the client credentials on a memory element. In some embodiments, the tester device 112 stores client credentials for multiple clients.

Figure 4:
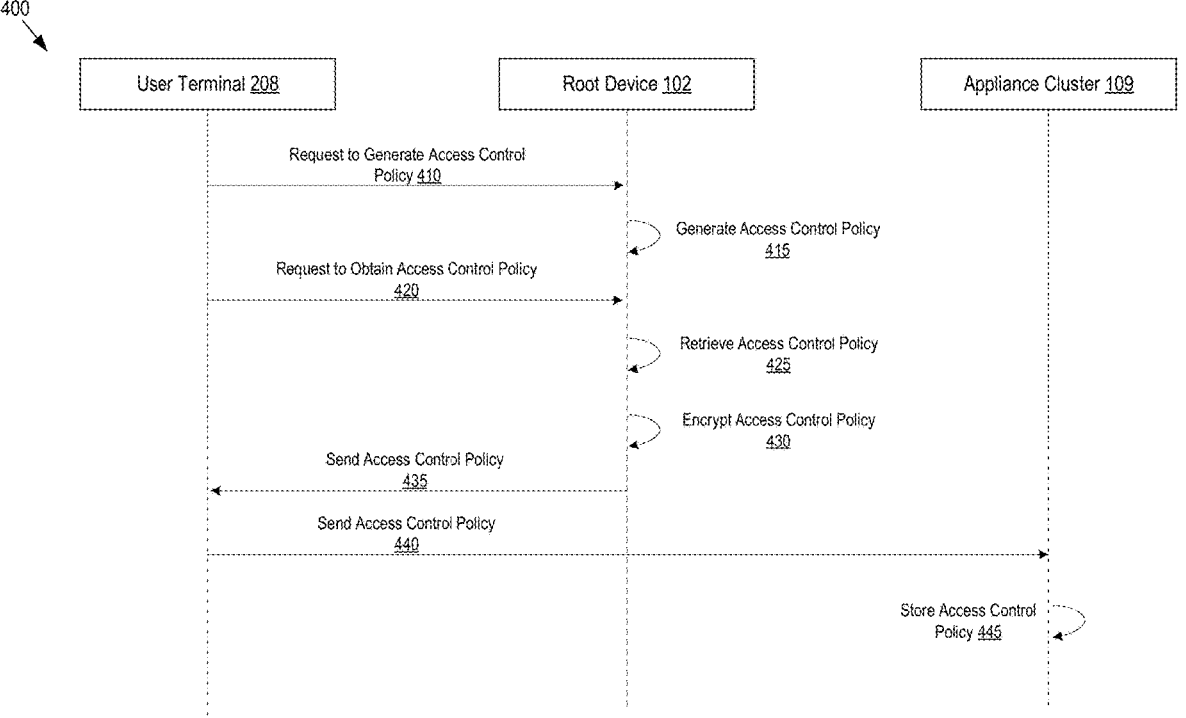
FIG. 4 is a sequence diagram illustrating creation and distribution of access control policies, in accordance with some embodiments of the disclosure.

FIG. 4 is a sequence diagram illustrating creation and distribution of access control policies, in accordance with some embodiments of the disclosure. Diagram 400 may include similar elements as illustrated in CM system 100 as described with respect to FIG. 1. It may be noted that elements of FIG. 1 may be used herein to help describe FIG. 4. The operations described with respect to FIG. 4 are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

Diagram 400 illustrates root device 102, appliance cluster 109, and user terminal 208. Diagram 400 relates to creating and distributing an access control policy for a client (or any component of the client). In some embodiments, the access control policy can indicate to which use cases one or more tester devices (e.g., tester device 112) of an appliance cluster 109 are granted access.

At operation 410, the user terminal 208 sends, to the root device 102, a request to generate an access control policy for an appliance cluster 109. The request can include identification data relating to the client (client identification data), such as, for example, a client name, the client identifier (ID), a tester device 112 ID, a High volume manufacturing site 130 ID, and an appliance cluster 109 ID, etc. The request can further include the desired access state (e.g., allow, deny, etc.) for each use case. For example, the request can instruct the root device 102 to set the access state for use case 1 to allow, but set the access state for use case 2 and use case 3 to deny. In some embodiments, the default access state to for each use case can be set to deny, and the request can include a list of use cases that are to be set to allow.

In some embodiments, the user terminal 208 can independently send the request to generate the access control policy for the client. In other embodiments, the user terminal 208 can initiate the request, which can the then be confirmed by a quorum of user terminals 208. Once confirmed by the quorum of user terminals 208 (e.g., a set of acknowledgments received from the quorum of user terminals 208), the request can be sent to the root device 102. Operation 410 performed for each client associated with an appliance cluster 109.

At operation 415, the root device 102 generates the access control policy for the specified appliance cluster 109. In some embodiments, the access control policy can be a data structure, such as, for example, a metadata table. For example, the metadata table can include a set of records, where each record lists a specific use case (e.g., via a use case identifier) and a corresponding access state. In some embodiments, the metadata table can further include a client identifier for a set of records.

FIG. 5 schematically illustrates example metadata maintained by the root device, in accordance with some embodiments of the present disclosure. In particular, the root device 102 can maintain an access control policy metadata table 510 and 520 for a particular appliance cluster 109. Access control policy metadata table 510 can include access control policies for Client A, and metadata table 520 can include access control policies for Client B. In some embodiments, the access control policy metadata table 510, 520 can be stored in the local memory of the root device 102. As illustrated by the access control policy metadata table 510, 520, each use case (e.g., use case 1, use case 2, etc.) correlates to a particular access state (e.g., allow, deny, etc.). For example, for Client A, access control policy metadata table 510 indicates that access to use case 1 is allowed, access to use case 2 is denied, access to use case 3 is denied, access to use case 4 is allowed, etc. For Client B, access control policy metadata table 510 indicates that access to use case 1 is allowed, access to use case 2 is allowed, access to use case 3 is allowed, access to use case 4 is denied, etc. In some embodiments, metadata table 510 and 520 can be a single metadata table.

Returning to FIG. 4, at operation 420, the user terminal 208 can send a request to obtain an access control policy for a particular appliance cluster 109. The request can include a client identifier, such as, for example, an appliance cluster identifier. In some embodiments, the user terminal 208 can independently send the request to obtain the access control policy for the appliance cluster 109. In other embodiments, the user terminal 208 can initiate the request, which can the then be confirmed by a quorum of user terminals 208.

At operation 425, the root device 102 retrieves the access control policy (e.g., retrieves the metadata table from memory).

At operation 430, the root device 102 encrypts the access control policy. In some embodiments, the access control policy can be encrypted with a cryptographic key or encryption standard, such as, for example, American Education Services (AES)-Galois/Counter Mode (GCM), AES-128, AES 256, etc. In some embodiments, the cryptographic key can be a pre-shared key (PSK) or any other cryptographic key was shared with the client or appliance cluster 109. In other embodiments, the access control policy can remain unencrypted.

At operation 435, the root device 102 sends the access control policy to the user terminal 208.

At operation 440, the root device 102 sends the access control policy to appliance cluster 109. For example, the access control policy can be transferred or sent to the control center 107, and then sent to the appliance cluster 109 (or any other component of the manufacturing site 130).

At operation 445, the appliance cluster 109 stores the access control policy on a memory element.

FIG. 6 is a sequence diagram illustrating enforcement of the access control policy, in accordance with some embodiments of the disclosure. Diagram 600 may include similar elements as illustrated in CM system 100 as described with respect to FIG. 1. It may be noted that elements of FIG. 1 may be used herein to help describe FIG. 6. The operations described with respect to FIG. 6 are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

Diagram 600 illustrates tester device 112, application 602, and hardware security module (HSM) 604. HSM 604 can include a library component and a module component. HSM 604 can be similar or the same as HSM 111. In some embodiments application 602 runs on a high-level OS, such as Linux or some other OS. In some embodiments, the OS and the application 602 can be operating on a first computing platform (platform A) while the library component and the module component can be operating on a second computing platform (platform B). It can be noted that in some embodiments, the library component and the module component can also be executed at different platforms (e.g., separate HSMs 111). In some embodiments, platform A can be an application 108 of an appliance cluster 109 and platform B can be an HSM of the same or different application 108 or appliance cluster 109. In embodiments where both platform A and platform B are operating on an appliance (same or different), application 602 can be executing on a first processing device (e.g., unsecured or untrusted processing device) and one or more of library component or module component can be executing on a second processing device (e.g., a secured and trusted processing device, such as a processing device of the HSM 111). In other embodiments, platform A and platform B can be entirely separate systems. For example, the library component and the module component can be executing at an HSM 111 of an application 108 and application 602 can be executing on a remote device outside appliance cluster 109. In some embodiments, platform A can be directly connected to a network, such as a public or private network, and be able to make calls to other devices outside the appliance cluster 109. In some embodiments, platform B is not connected to a network and/or cannot makes calls to devices outside the appliance cluster 109.

At operation 610, the tester device 112 sends a request, to application 602, to generate a secure data asset. For example, the tester device 112 can be performing one or more operations related to a product (e.g., a chipset) for a particular client. The set of operations can then require the use of a secure data asset. In some embodiments, this request can be referred to as a request to invoke a use case. In some embodiments, the request from tester device 112 can identify and/or include one or more of the client credentials, an identifier of the use case (e.g., use case name), application name, context name, module name, PCD name, use case arguments A, credentials (e.g., Transport Layer Security (TLS) certificates) or an identifier of the version of the library component to be used with the requested use case.

In some embodiments, an argument (e.g., use case argument) can be data that is used as input, at least in part, to a module to generate a secure data asset. In some embodiments, the arguments can include a variable list of arguments. In some embodiments, the arguments are specific to the use case. The arguments can include any type of data, such as device information, data related to a true random number generator, time of day, etc. In some embodiments, the arguments can include specific feature bits for a module component such that the module component can implement specific features based on the feature bits. In some embodiments, the arguments can include memory offsets that determine where the resulting keys are stored at application 602 (e.g., keys used to generate secure data asset).

In some embodiments, tester device 112 uses a library, such as CM library (e.g., client library 114) to facilitate the request (e.g., call) to application 602. In some embodiments, the request from tester device 112 can use a protocol such as HTTP, (e.g., an HTTP type request).

At operation 615, the application 602 authenticates the client associated with the operations performed by the tester device 112. In some embodiments, the application 602 can verify the client associated with the request to invoke the use case. In some embodiments, the application 602 can compare the client credentials received in the request with a stored record of the client credentials for the client. If the client credentials of the request matches the client credentials of the record, the application 602 can authenticate the client. In some embodiments, the application 602 can authenticate a certificate associated with the client credentials received in the request. For example, the application 602 can decrypt the certificate using a cryptographic key, and extract the client identification data (e.g., a client identifier). Responsive to authenticating the client, the application 602 proceeds to operation 620. Responsive to failing to authenticate the client, the application 602 can deny the request.

At operation 620, the application 602 sends a request, to the HSM 604, to determine whether the client can access the use case. In some embodiments, the request can include one or more of the access control policy, client identification data, and the identifier of the desired use case. In some embodiments, the client identification data can be obtained from the client credentials, or from other data obtained from the request sent at operation 610. The access control policy can be obtained from a memory element of the application 602. In some embodiments, the access control policy can be encrypted.

At operation 625, HSM 604 decrypts the access control policy. In some embodiments, HSM 604 can use a cryptographic key, such as the pre-shared key (PSK)), to decrypt the access control policy.

At operation 630, HSM 604 determines whether the client is granted access to the identified use case. In some embodiments, HSM 604 can perform a lookup of the access control policy metadata table (e.g., metadata table 510 or 520) to determine whether the client is granted access to the identified use case. For example, HSM 604 can locate, in the metadata table for the particular client, the use case identifier corresponding to the desired use case, and determine whether the corresponding access state is set to allow or deny.

Responsive to the lookup indicating that client is granted access to the particular use case, at operation 635, HSM 604 sends an allow instruction to application 602. Responsive to the lookup indicating that client is denied access to the particular use case, at operation 650, HSM 604 sends a deny instruction application 602.

In some embodiments, responsive to the lookup indicating that the client is granted access to the identified use case, the HSM 604 can further perform one or more additional operations to determine that the client is allowed access to the identified use case. In particular, the HSM 604 can obtain or determine additional data related to the request at operation 620, such as, for example, the date of the request, the time of the request, the operating state of the tester device 112, the operating state of the appliance device or appliance cluster associated with the tester device 112, etc. The HSM 604 can then compare this additional data to a set of a predetermined criterion such as, for example, a threshold value, an entry in a metadata table, etc. Responsive to the additional data satisfying the threshold criterion, the HSM 604 can then send the allow instruction, at operation 635, to application 602. Responsive to the additional data failing to satisfy the threshold criterion, the HSM 604 can send the deny instruction, at operation 650, to application 602.

Responsive to receiving the allow instruction, at operation 640, the application 602 can generate the secure data asset requested by the use case. In one embodiment, the application 602 can perform a set of operations, in coordination with HSM 604, to generate the secure data asset. An example embodiment illustrating the operations related to generating the secure data asset of operation 640 is discussed in relation to FIG. 7 below. At operation 645, the application 602 sends the generated secure data asset to the tester device 112.

Responsive to receiving the deny instruction, at operation 655, the application 602 can deny tester device 112 access the secure data asset (e.g., denying the request to invoke the requested use case). For example, application 602 can send an "access denied" message, ignore the request to generate a secure data asset, etc.

Figure 7:
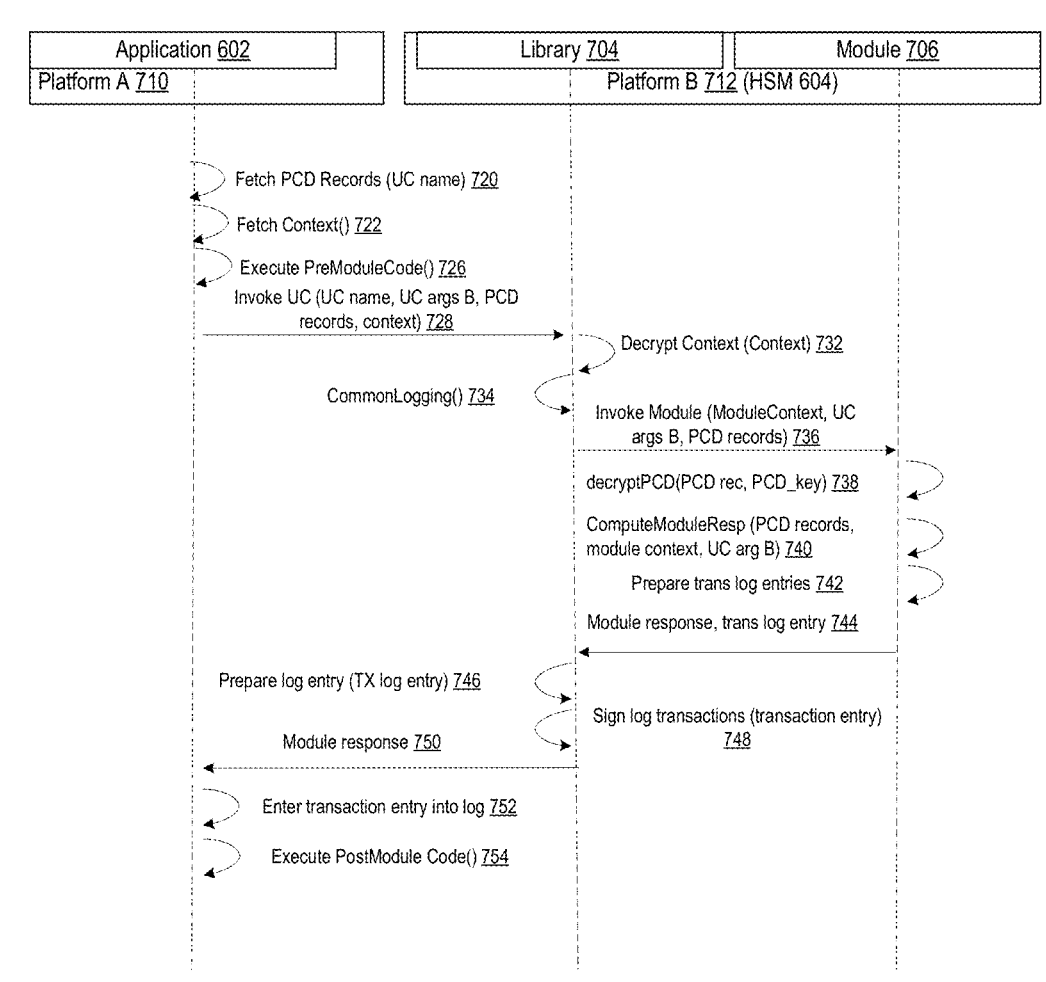
FIG. 7 is a sequence diagram illustrating execution of a use case (UC) at a CM system, in accordance with some embodiments of the disclosure.

FIG. 7 is a sequence diagram illustrating execution of a use case (UC) at a CM system, in accordance with some embodiments of the disclosure. Diagram 700 may include similar elements as illustrated in CM system 100 described with respect to FIG. 1. It may be noted that elements of FIG. 1 may be used herein to help describe FIG. 7. The operations described with respect to FIG. 7 are shown to be performed serially for the sake of illustration, rather than limitation. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed.

Diagram 700 illustrates application 602, library 704, and module 706. In some embodiments, application 602 runs on a high-level OS, such as Linux or some other OS. In some embodiments, the OS and the application can be operating on platform A 710. In some embodiments, library component 704 and module 706 can be operating on platform B 712. It can be noted that in some embodiments, library component 704 and module 706 can be executed at different platforms (e.g., separate HSMs 111). In some embodiments, platform A 710 can be an appliance 108 of an appliance cluster 109 and platform B 712 can be an HSM of the same or different appliance 108 or appliance cluster 109. In embodiments where both platform A 710 and platform B 712 are operating on an appliance (same or different), application 602 can be executing on a first processing device (e.g., unsecured or untrusted processing device) and one or more of library component 704 or module 706 can be executing on a second processing device (e.g., a secured and trusted processing device, such as a processing device of the HSM 111). In other embodiments, platform A 710 and platform B 712 can be entirely separate systems. For example, library component 704 and module 706 can be executing at an HSM 111 of an appliance 108 and application 602 can be executing on a remote device outside appliance cluster 109. In some embodiments, platform A 710 can be directly be connected to a network, such as a public or private network, and be able to make calls to other devices outside the appliance cluster 109. In some embodiments, platform B 712 is not directly connected to a network and/or cannot makes calls to devices outside the appliance cluster 109. It can be noted that in some embodiments, a use case can be executed across multiple platforms, such as platform A 710 and platform B 712.

In some embodiments, the operations of diagram 700 can be performed during operation 640 of FIG. 6. In particular, the operations of diagram 700 can execute a use case to generate a secure data asset. Operation 720 can be executed in response to application 602 receiving an allow instruction from HSM 604. As discussed above, the request, from tester device 112, to generate a use case (e.g., request to invoke a use case) can identify and/or include one or more of an identifier of the use case (e.g., use case name), application name, context name, module name, PCD name, use case arguments A, credentials (e.g., Transport Layer Security (TLS) certificates) or an identifier of the version of the library component 704 to be used with the requested use case. In some embodiments, an argument (e.g., use case argument) can be data that is used as input, at least in part, to a module to generate a secure data asset. In some embodiments, the arguments can include a variable list of arguments. In some embodiments, the arguments are specific to the use case. The arguments can include any type of data, such as device information, data related to a true random number generator, time of day, etc. In some embodiments, the arguments can include specific feature bits for a module such that the module can implement specific features based on the feature bits. In some embodiments, the arguments can include memory offsets that determine where the resulting keys are stored at platform A 710 (e.g., keys used to generate secure data asset).

At operation 720, application 602 performs an operation to identify one or more PCD records (e.g., PCDs). In some embodiments, application 602 retrieves one or more PCDs using the use case name or application name, or other identifiers in the request (e.g., operation 242). In some embodiments, the retrieved PCDs can be used by module

706 in the generation of a secure data asset. In other embodiments, application 602 may generate PCDs.

Pre-computed data (PCD) can refer to data, generally encrypted data. In some embodiments, the PCD may be used by a module as input to generate a secure asset. In some embodiments, a PCD can be used by the application. For example, a PCD can be used as input by the application to generate another PCD. A PCD can be consumable such that each time a PCD is used (e.g., in the execution of a use case) the old PCD retired and a new PCD is allocated. For example, a PCD can identify a unique device ID. Once the unique device ID is provisioned to a target device, the first PCD is retired from subsequent use. To provision a new target device, a second PCD is used that can identify a second unique device ID, and so forth. In some embodiments, a PCD can be designed as data that varies between different executions of a use case.

At operation 722, application 602 identifies a context that is to be used with the particular use case. In some embodiments, application 602 retrieves the context based on the use case name. In some embodiments, the context is encrypted context data.

At operation 724, application 602 executes one or more pre-module operations. In some embodiments, the one or more pre-module operations are executed prior to the module generating the secure data asset of the use case (e.g., before the module is called to generate the secure data asset). In some embodiments, the pre-module operations can include some custom code that is specific to the particular application 602. The pre-module operations can use the additional computer resources that are available to the application 602 (and in contrast to the library component 704 and/or module 706, in some case). The additional resources can include one or more of network connectivity, computational resources, storage resources, and network bandwidth, for example.

In some embodiments, a pre-module operation can include the retrieval or generation of additional information related to the request to generate a secure data asset (e.g., from the tester device 112 or even the request to the library component 704 or module 706). In some, embodiments, a pre-module operation can include a call on the network (e.g., public or private) to retrieve some information or request a service, for example, For example, a pre-module operation can include a generation of a certificate, a call (e.g., HTTP) to the cloud service provide, a call to any service provide, a generation of the a message to an administrator, etc. It can be noted that the pre-module operation can be implemented to provide flexibility in the provisioning of secure data assets to target devices, such that the data/computation/operation pipeline between tester device 112 and module 706 can be customized for each use case and/or application 602 and to take advantage of the computer resource available to the application 602 in a secure manner.

At operation 728, application 602 sends to platform B 712 (e.g., library component 704) a request to generate a secure data asset. In some embodiments, the request is to invoke the particular use case. In some embodiments, the request identifies and/or includes one or more of an identifier of the use case name, module name, application name, arguments B, PCD records identifying one or more PCDs, context data (e.g., encrypted context data) or an identifier of the version of the library component 704 to be used with the requested use case.

In some embodiments, the arguments B can be identical to arguments A. For example, application 602 can pass the arguments A received from tester device 112 to module 706.

In some embodiments, arguments B can be different than arguments A received from tester device 112. For example, application 602 can modify some or all of the arguments A and send the modified arguments, e.g., arguments B, to module 706. In another example, application 602 can generate new arguments B based at least in part on arguments A. In some embodiments, arguments B are at least related to arguments A received from tester device 112.

In some embodiments, the context data is encrypted context data (e.g., received as encrypted context data). In some embodiments, the request to module 706 from application 602 can be a remote procedure call (RPC). In some embodiments, the request to module 706 from application excludes a request using an HTTP type request.

At operation 732, in response to the request from application 602 to generate the secure data asset, library component 704 can decrypt the context using a cryptographic key. As noted herein, the library can, at least on some embodiments, be an interface between the application 602 and module 706 to perform one or more standard functions or standard procedures. In some embodiments, the library component 704 can serve a middleware. In some embodiments, the library component 704 can identify one or more functions and procedures and/or execute one or more of the functions and procedures on behalf of the module 706.

It can be noted that in embodiments that implement an identifier of the version of the library component 704, the library component 704 can use the identifier to execute the proper version of the library component 704 and the proper version of the library component 704 can be used to perform the operations of the library component 704.

At operation 734, library component 704 performs a logging operation (e.g., common logging) to log at least one or more of the operations performed by library component 704, requests received by library component 704, or requests sent by library component 704. In some embodiments, one or more of the entries (or the log itself) of the common log is cryptographically signed. In some embodiments, the logging operation can be part of secure logging to build an audit trail within the HSM 111.

At operation 736, library component 704 sends a request to module 706 to generate the secure data asset. In some embodiments, the request is to invoke the module 706. In some embodiments, the request identifies and/or includes one or more of the context (e.g., decrypted context data or encrypted context data if library component 704 does not perform operation 252), arguments B, or PCD records. In some embodiments, the request is made using an RPC.

At operation 738, module 706 identifies the PCD key and decrypts the PCD records.

At operation 740, module 706 generates the module response that includes the secure data asset(s). In generating the secure data asset, module 706 uses one or more of the decrypted PCD records, decrypted context and arguments B. As noted herein, the generation of the secure data asset is secured within HSM 111. In some embodiments, the secure data asset is encrypted by the module 706. As noted herein, the secure data asset can include one or more of encrypted data, authenticated data, or certificates. Examples of the secure data asset can include, but is not limited to one or more of a signed certificate, cryptographic keys, random number generated values (or related values), or unique device identifiers.

At operation 742, module 706 performs a logging operation that generates one or more transaction log entries In some embodiments, the transaction log entries can include information related to the request received from library component 704, the response sent by module 706 (e.g., operation 744), or the generation of the module response (e.g. information related to the secure data asset (e.g., certificate) that was generated).

At operation 744, module 706 sends a response (e.g., module response) to library component 704. The response can include the module response that can include the secure data asset (e.g., encrypted secure data asset). In some embodiments, the response is sent using an RPC. In some embodiments, the response can include one or more of the transaction log entries.

At operation 746, library component 704 prepares the transaction log entry (ies) received from module 706. The transaction log entries can be modified by the library component 704.

At operation 748, library component 704 signs the transactional entry with a cryptographic key.

At operation 750, library component 704 sends the module response including the secure data asset to application 332. In some embodiments, the module response can include the one or more transaction entries, such as an encrypted transactional entry.

At operation 752, application 602 stores the one or more transaction entries into a log, such as the common log. In some embodiments, the transactional entry can be stored in a log other than the common log, such as a transaction log.

At operation 754, application 602 performs one or more post-module operations. In some embodiments, a post-module operation can be performed after module 706 returns module response.

In some embodiments, a post-module operation can be similar to a pre-module operation. In some embodiments, a post-module operation can include the retrieval or generation of additional information related to the request to generate a secure data asset (e.g., from the tester device 112 or even the request to the library component 704 or module 706). In some, embodiments, a post-module operation can include a call on the network (e.g., public or private) to retrieve some information or request a service, for example, In another example, the post-module operation can include some operation that generates or retrieves some information based on the module response. For instance, the application 602 can use some or all of the module response to perform a calculation or reformat the module response prior to sending the module response to the tester device 112. It can be noted that the post-module operation can be implemented to provide flexibility in the provisioning of secure data assets to target devices, such that the data/computation/operations pipeline between tester device 112 and module 706 can be customized for each use case and/or application 602 and to take advantage of the computer resource available to the application 602 in a secure manner.

Application 602 can then execute operation 645, as discussed in regards to FIG. 6 above. For example, application 602 can send, to tester 112, the requested secure data asset. In some embodiments, tester device 112 uses the use case response and the secure data asset identified therein to provision the secure data asset to a CM Core of the target device.

Although a single request from application 602 to platform B 712 is illustrated (e.g., operation 728), it can be appreciated that application 602 can make one or more requests to platform B 712. In some embodiments, application 602 can request to invoke a different use case and one or more of operations 728 through 752 can be repeated for the different use case.

FIG. 8 and FIG. 9 depict methods 800 and 900 respectively. Each of the aforementioned methods' individual functions, routines, subroutines, or operations can be performed by a processing device, having one or more processing units (CPU) and memory devices communicatively coupled to the CPU(s). In some embodiments, the aforementioned methods can be performed by a single processing thread or alternatively by two or more processing threads, each thread executing one or more individual functions, routines, subroutines, or operations of the method. The aforementioned methods as described below can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, method 800 can be performed by an application, such as application 602 described in FIG. 1, FIGS. 2A-2B and FIGS. 6-7. In some embodiments, method 900 is performed by a HSM, such as HSM 604 described in FIG. 1, FIGS. 2A-2B and FIGS. 6-7. Although shown in a particular sequence or order, unless otherwise specified, the order of the operations can be modified. Thus, the illustrated embodiments should be understood only as examples, and the illustrated operations can be performed in a different order, while some operations can be performed in parallel. Additionally, one or more operations can be omitted in some embodiments. Thus, not all illustrated operations are required in every embodiment, and other process flows are possible. In some embodiments, the same, different, fewer, or greater operations can be performed. It may be noted that elements of FIG. 1, FIGS. 2A-2B and FIGS. 6-7 may be used herein to help describe FIG. 8 and FIG. 9.

FIG. 8 depicts a flow diagram of an example method 800 of using an application running on a high-level OS in the provisioning of a secure data asset to a target device, in accordance with some embodiments of the disclosure.

At operation 802 of method 800, processing logic receives a first request to generate a secure data asset. The first request can be received from a tester device. The first request can be received by an application executing at a first platform (e.g., platform A). In some embodiments, the first request comprises secure client identification data or client credentials.

At operation 804, responsive to authenticating the client, the processing logic can send, to a second platform, a second request to determine whether the client can (e.g., is granted) access the secure data asset. In some embodiments, the second request comprises an access control policy. In some embodiments, the second platform comprises an HSM. In some embodiments, the secure data asset comprises one or more of encrypted data, authenticated data, or a certificate. In some embodiments, responsive to failing to authenticate the client, the processing logic can deny the tester device access the secure data asset.

At operation 806, responsive to receiving an indication, from the second platform, that the client can access the secure data asset, the processing logic can perform one or more operations to generate the secure data asset. In some embodiments, the access control policy comprises a set of records each including a particular use case generating of a particular secure data asset and a corresponding access state. In some embodiments, the access control policy is encrypted. In some embodiments, responsive to receiving an indication that the client does not have access the secure data asset, the processing logic can deny the tester device access the secure data asset.

At operation 808, the processing logic can send, to the tester device, the generated secure data asset.

FIG. 9 depicts a flow diagram of an example method 900 of using a HSM to enforce the access control policy, in accordance with some embodiments of the disclosure.

At operation 902 of method 900, processing logic receives a request to determine whether a client can (e.g., is granted) access the secure data asset. In some embodiments, the request can be received by a first platform. In some embodiments, the first platform comprises a HSM. In some embodiments, the request can be received from an application executing on a second platform. In some embodiments, the request comprises an access control policy. In some embodiments, the access control policy comprises a set of records each including a particular use case for generating of a particular secure data asset and a corresponding access state. In some embodiments, the secure data asset comprises one or more of encrypted data, authenticated data, or a certificate.

At operation 904, the processing logic determines whether the client can access the secure data asset based on the access control policy. In some embodiments, the processing logic first decrypts the access control policy.

At operation 906, responsive to determining that the client can access the secure data asset, the processing logic sends, to the second platform, an indication that the tester device can access the secure data asset. In some embodiments, responsive to determining that the tester device does not have access the secure data asset, the processing logic sends, to the second platform, an indication that the tester device cannot access the secure data asset.

In some embodiments, the processing logic receives, from the application, another request to generate the secure data asset, then generates the secure data asset, and sends, to the second platform, the secure data asset.

Figure 10:
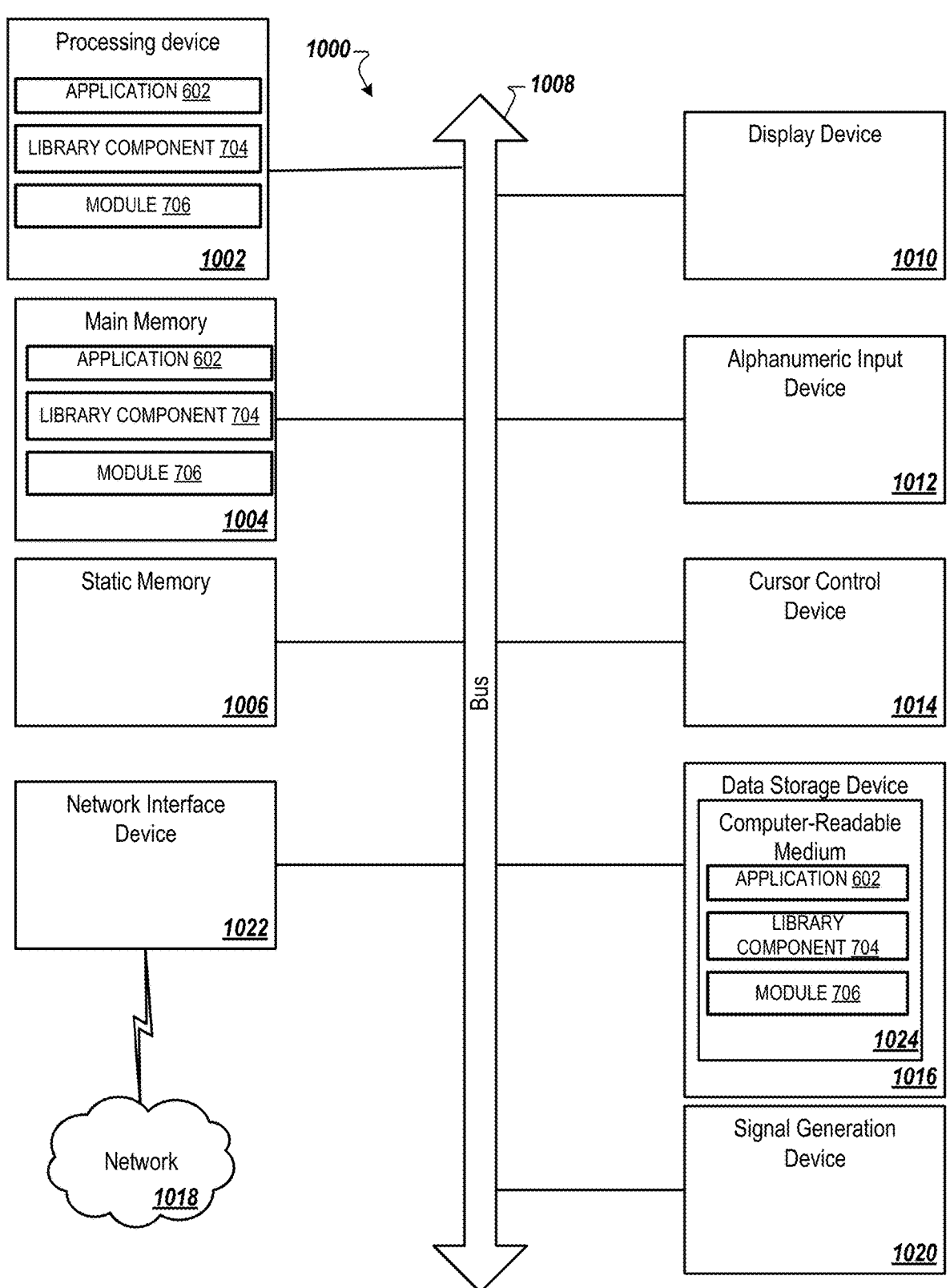
FIG. 10 is a block diagram illustrating an exemplary computer system, in accordance with some embodiments of the disclosure.

FIG. 10 is a block diagram illustrating an exemplary computer system 1000, in accordance with some embodiments of the disclosure. The computer system 1000 executes one or more sets of instructions that cause the machine to perform any one or more of the methodologies discussed herein. Set of instructions, instructions, and the like may refer to instructions that, when executed by computer system 1000, cause computer system 1000 to perform one or more operations of application 602, library component 704 and/or module 706. The machine may operate in the capacity of a server or a client device in a client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions to perform any one or more of the methodologies discussed herein.

The computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a data storage device 1016, which communicate with each other via a bus 1008.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, or a processing device implementing other instruction sets or processing devices implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute instructions of the system architecture 100 and application 602, library component 704 and/or module 706 for performing the operations discussed herein.

The computer system 1000 may further include a network interface device 1022 that provides communication with other machines over a network 1018, such as a local area network (LAN), an intranet, an extranet, or the Internet. The computer system 1000 also may include a display device 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1020 (e.g., a speaker).

The data storage device 1016 may include a non-transitory computer-readable storage medium 1024 on which is stored the sets of instructions of the system architecture 100 of application 602, library component 704 and/or module 706 embodying any one or more of the methodologies or functions described herein. The sets of instructions of the system architecture 100 and of application 602, library component 704 and/or module 706 may also reside, completely or at least partially, within the main memory 1004 and/or within the processing device 1002 during execution thereof by the computer system 1000, the main memory 1004 and the processing device 1002 also constituting computer-readable storage media. The sets of instructions may further be transmitted or received over the network 1018 via the network interface device 1022.

While the example of the computer-readable storage medium 1024 is shown as a single medium, the term "computer-readable storage medium" can include a single medium or multiple media (e.g., a centralized or distributed database, and/or associated caches and servers) that store the sets of instructions. The term "computer-readable storage medium" can include any medium that is capable of storing, encoding or carrying a set of instructions for execution by the machine and that cause the machine to perform any one or more of the methodologies of the disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the disclosure may be practiced without these specific details. In some instances, well-known structures and devices are shown in block diagram form, rather than in detail, in order to avoid obscuring the disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It may be borne in mind, however, that all of these and similar terms are to be associated with the appropriate physical quantities and are merely convenient labels applied to these quantities. Unless specifically stated otherwise, it is appreciated that throughout the description, discussions utilizing terms such as "authenticating", "providing", "receiving", "identifying", "determining", "sending", "enabling" or the like, refer to the actions and processes of a computer system, or similar electronic computing device, that manipulates and transforms data represented as physical (e.g., electronic) quantities within the computer system memories or registers into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including a floppy disk, an optical disk, a compact disc read-only memory (CD-ROM), a magnetic-optical disk, a read-only memory (ROM), a random access memory (RAM), an erasable programmable read-only memory (EPROM), an electrically erasable programmable read-only memory (EEPROM), a magnetic or optical card, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims may generally be construed to mean "one or more" unless specified otherwise or clear from context to be directed to a singular form. Moreover, use of the term "an implementation" or "one implementation" or "an embodiment" or "one embodiment" throughout is not intended to mean the same implementation or embodiment unless described as such. The terms "first," "second," "third," "fourth," etc. as used herein are meant as labels to distinguish among different elements and may not necessarily have an ordinal meaning according to their numerical designation.

For simplicity of explanation, methods herein are depicted and described as a series of acts or operations. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

In additional embodiments, one or more processing devices for performing the operations of the above described embodiments are disclosed. Additionally, in embodiments of the disclosure, a non-transitory computer-readable storage medium stores instructions for performing the operations of the described embodiments. Also in other embodiments, systems for performing the operations of the described embodiments are also disclosed.

It is to be understood that the above description is intended to be illustrative, and not restrictive. Other embodiments will be apparent to those of skill in the art upon reading and understanding the above description. The scope of the disclosure may, therefore, be determined with reference to the appended claims, along with the full scope of equivalents to which such claims are entitled.

What is claimed is:

1. A method comprising:
receiving, by an application executing at a first platform, from a tester device in communication with the first platform and configured to program a secure data asset associated with testing a semiconductor device, a first request to generate the secure data asset for a client;
responsive to authenticating the client, sending, to a second platform, a second request to determine whether the client has access to the secure data asset;
responsive to receiving an indication, from the second platform, that the client has access to the secure data asset, performing one or more operations to generate the secure data asset; and
sending, to the tester device, the secure data asset for testing the semiconductor device.

2. The method of claim 1, wherein the second request comprises an access control policy.

3. The method of claim 2, wherein the access control policy comprises a set of records each including a particular use case for generating a particular secure data asset and an access state for the particular use case.

4. The method of claim 2, wherein the access control policy is encrypted.

5. The method of claim 1, wherein the first request comprises secure client identification data.

6. The method of claim 1, wherein the second platform comprises a hardware security module (HSM).

7. The method of claim 1, wherein the secure data asset comprises one or more of encrypted data, authenticated data, or a certificate.

8. The method of claim 1, further comprising:
responsive to receiving an indication that the client does not have access the secure data asset, denying the tester device access to the secure data asset.

9. The method of claim 1, further comprising:
responsive to failing to authenticate the client, denying the tester device access to the secure data asset.

10. A method comprising:

receiving, by a first platform and from an application executing on a second platform, a request to determine whether a client has access to a secure data asset, wherein the request comprises an access control policy;

determining whether the client has access to the secure data asset based on the access control policy; and responsive to determining that the client has access to the secure data asset, sending, to the second platform, an indication that a tester device is allowed to access the secure data asset, wherein the tester device is config-ured to program a secure data asset associated with testing a semiconductor device.

11. The method of claim 10, further comprising;

receiving, from the application, another request to gener-ate the secure data asset;

generating the secure data asset; and sending, to the second platform, the secure data asset.

12. The method of claim 10, further comprising:

decrypting the access control policy.

13. The method of claim 10, wherein the first platform comprises a hardware security module (HSM).

14. The method of claim 10, wherein the access control policy comprises a set of records each including a particular use case for generating a particular secure data asset and an access state for the particular use case.

15. The method of claim 10, wherein the secure data asset comprises one or more of encrypted data, authenticated data, or a certificate.

16. The method of claim 10, further comprising:

responsive to determining that the client does not have access to the secure data asset, sending, to the second platform, an indication that the tester device is not allowed to access the secure data asset.

17. A cryptographic management system, comprising:

a memory device; and a processing device, couple to the memory device, to:

receive, using an application executing at a first platform, from a tester device in communication with the first platform and configured to program a secure data asset associated with testing a semiconductor device, a first request to generate the secure data asset for a client;

responsive to authenticating the client, send, to a second platform, a second request to determine whether the client has access to the secure data asset;

responsive to receiving an indication, from the second platform, that the client has access to the secure data asset, perform one or more operations to generate the secure data asset; and send, to the tester device, the secure data asset for testing the semiconductor device.

18. The cryptographic management system of claim 17, wherein:

the second request comprises an access control policy; and wherein the access control policy comprises a set of records each including a particular use case for gener-ating a particular secure data asset and an access state for the particular use case.

19. The cryptographic management system of claim 17, wherein the first request comprises secure client identifica-tion data.

20. The cryptographic management system of claim 17, wherein the processing device is further to:

responsive to receiving an indication that the client does not have access the secure data asset, deny the tester device access to the secure data asset.

* * * * *